J. IVES.
Carriage-Top.
No. 66,496.
Patented July 9, 1867.
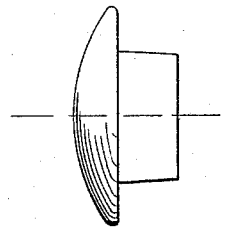
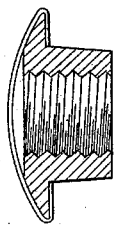
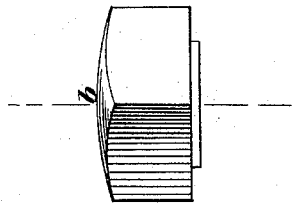
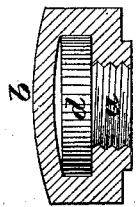
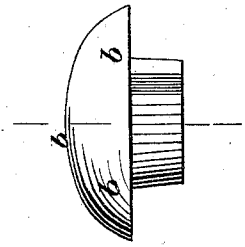
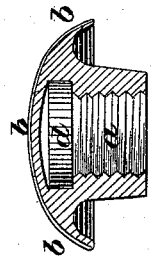
Witnesses:
Inventor:

United States Patent Office.

JAMES IVES, OF MOUNT CARMEL, CONNECTICUT.

Letters Patent No. 66,496, dated July 9, 1867.

---

IMPROVEMENT IN TOP PROP-NUT FOR CARRIAGES.

---

The Schedule referred to in these Letters Patent and making part of the same.

---

TO WHOM IT MAY CONCERN:

Be it known that I, JAMES IVES, of Mount Carmel, in the county of New Haven, and State of Connecticut, have invented a Top Prop-Nut for Carriages; and I do hereby declare the following to be a full, clear, and exact description thereof, reference being had to the accompanying drawings, making part of this specification, in which—

Figure 1 is a view of one side of the improved circular-head nut.

Figure 2 is a diametrical section through the nut.

Figures 3 and 4 show the improved mode of constructing square nuts.

Figures 5 and 6 show the old mode of constructing the nuts.

Similar letters of reference indicate corresponding parts in the several figures.

This invention relates to an improvement of the constructing of nuts commonly called "top prop-nuts," which are especially designed for receiving projecting screw-bolts used in connecting many of the parts composing a carriage-top, and which require to be ornamented, and to present a neat appearance on their outer faces, because of the exposed positions which they occupy. Hitherto this class of nuts has been constructed by casting them with holes entirely through their centres, in which screw-threads were cut, and then ornamenting their convex heads by the application of thin plates of brass or silvered metal. These nuts have also been made solid, and their sockets formed by drilling and screw-tapping. The objection to the first-mentioned nuts is, that the thin sheet metal used for ornament has no support except at the circumference of the head, and is soon defaced and indented by contact with any hard object. To construct these nuts so that their faces will be preserved uninjured, and also to obviate the use of separate plates for covering their heads, the nature of my invention consists in casting the nuts with sockets which do not pass through them, thus leaving solid heads, and admitting of the finishing of these heads by any of the well-known processes of plating, as will be hereinafter described.

To enable others skilled in the art to understand my invention, I will describe its construction and operation.

I have represented two forms of my improved nuts in the accompanying drawings, both of which are constructed alike, the only difference between them being that one has a circular head and the other a rectangular head. I have also shown one of the old forms of nuts, constructed with a hole entirely through it, and having its head formed by a thin plate of metal covering one end of the hole and left unprotected thereat. It will be seen by reference to the sectional views, figs. 2 and 4, that the screw-sockets $a$ do not pass entirely through the nuts, but terminate within the heads thereof, in a chamber, $d$, of greater diameter or area than the threaded portions of the sockets, so that as much metal as possible can be left out of the nuts, to secure lightness and prevent them from casually working loose on their bolts. By not having the sockets $a$ to pass entirely through the nuts, I leave the convex heads $b$ thereof solid, as shown in the two sectional views referred to. This gives a convex surface, which can be finished by applying silver or other metal to it, in the usual manner of plating metal surfaces. This solid head possesses sufficient strength to prevent defacement or indentation by striking against an object, or by the pressure of the end of the screw upon which it is applied against its inner surface, and it will always present the convex form given to it.

In producing these improved nuts, I make an impression in sand, so as to form a mould of the external shape and size of the nut which it is desired to cast, and employ in this mould a sand core for producing the socket $a$ and chamber $d$. After the metal is poured into the mould and cooled, the sand core is knocked out and a thread cut in the socket by means of a screw-tap.

Having described my invention, what I claim as new, and desire to secure by Letters Patent, is—

As a new and improved article of manufacture, a top prop-nut, constructed with a solid head on screw-tapped socket.

JAMES IVES.

Witnesses:
J. H. KINGSLEY,
GEO. BRADLEY.